United States Patent
Ito et al.

(10) Patent No.: US 8,040,120 B2
(45) Date of Patent: Oct. 18, 2011

(54) SWITCHING DC-DC CONVERTER AND OSCILLATOR

(75) Inventors: Koichi Ito, Saitama (JP); Joichi Saito, Saitama (JP)

(73) Assignee: Sanken Electric Co., Ltd, Niiza-Shi, Saitama-Ken (JP)

( * ) Notice: Subject to any disclaimer, the term of this patent is extended or adjusted under 35 U.S.C. 154(b) by 438 days.

(21) Appl. No.: 12/207,286

(22) Filed: Sep. 9, 2008

(65) Prior Publication Data
US 2009/0102445 A1    Apr. 23, 2009

(30) Foreign Application Priority Data
Oct. 23, 2007 (JP) ................... P2007-275436

(51) Int. Cl.
*G05F 1/00* (2006.01)
(52) U.S. Cl. ........................... 323/285; 363/50
(58) Field of Classification Search ............. 323/282, 323/284, 285, 271, 272; 363/50
See application file for complete search history.

(56) References Cited

U.S. PATENT DOCUMENTS
2005/0083024 A1 * 4/2005 Harris et al. ............ 323/282
2006/0013021 A1 * 1/2006 Aso .......................... 363/21.09

FOREIGN PATENT DOCUMENTS
JP    9098571    4/1997
JP    10229674   8/1998

* cited by examiner

*Primary Examiner* — Harry Behm
*Assistant Examiner* — Matthew Grubb
(74) *Attorney, Agent, or Firm* — Wilmer Cutler Pickering Hale and Dorr LLP

(57) ABSTRACT

A switching DC-DC converter includes: an output voltage detecting unit configured to detect a DC output voltage; an error amplifying unit configured to compare the detected output voltage and a reference voltage and configured to supply an amplified error signal between the detected output voltage and the reference voltage to the pulse width modulating unit; and a single oscillating unit connected to an output of the output voltage detecting unit and an output of the error amplifying unit and operable on a first oscillating mode and a second oscillation mode. The oscillating unit on the first oscillating mode controls a switching frequency of the power switch based on the detected output voltage. The oscillating unit on the second oscillating mode controls the switching frequency of the power switch based on the amplified error signal.

9 Claims, 4 Drawing Sheets

SWITCHING DC-DC CONVERTER AND OSCILLATOR

CROSS-REFERENCE TO RELATED APPLICATIONS

This application is based upon and claims priority from Japanese Patent Application No. 2007-275436 filed on Oct. 23, 2007, the entire contents of which are incorporated herein by reference.

BACKGROUND OF THE INVENTION

1. Technical Field

This invention relates to a switching DC-DC converter (hereinafter referred to as a DC-DC converter) which has a overcurrent protection feature and generates an output voltage by the constant voltage control of changing the frequency according to a load condition.

2. Description of the Related Art

A DC-DC converter reduces an output voltage when the DC-DC converter enters an overcurrent operation due to an increase in a load current. When the output voltage has lowered greatly, the DC-DC converter lowers the switching frequency to prevent the overcurrent value from increasing. An example of the DC-DC converter is disclosed in JP-A-10-229674.

In order to improve the efficiency when the load is low, another DC-DC converter lowers the switching frequency, thereby reducing the loss of a power switch due to switching. An example of another DC-DC converter is disclosed in JP-A-9-98571.

BRIEF SUMMARY OF THE INVENTION

The above DC-DC converters respectively include dedicated circuits to perform the above respective two features. Therefore, in order to realize a combination of the former and the latter of the above features, different control circuits corresponding to both features are required and the outputs from the control circuits must be unified into a single output. This requires a complicate circuit for selecting a lower one of two oscillating frequencies.

Further, in order that a single oscillator is provided to have the above respective features, since both oscillation frequencies are changed by different methods, it is difficult to combine these features as they are. Therefore, the circuit is more complicate than only the addition of both devices. Further, the above DC-DC converters do not serve both features. If an integrated circuit of semiconductor devices is formed, the above circuit is complicated, thereby increasing the chip area and leading to a cost increase.

In view of the above circumstance, an object of an aspect of the invention is to provide an DC-DC converter in a simple configuration at low cost, which can collectively control in a single circuit the operation common to the function of lowering the frequency during overcurrent control conditions and function of lowering the frequency during low load conditions, thus reducing the size of the control circuit and reducing the chip area in an integrated circuit of semiconductor devices thereby to make both functions compatible.

According to a first aspect of the invention, there is provided a switching DC-DC converter comprising: at least one power switch; a pulse width modulating unit configured to control on/off timing of the power switch; an inductor having one end connected to the power switch; a smoothing unit connected to the other end of the inductor and configured to produce a smoothed DC output voltage; an output voltage detecting unit configured to detect the DC output voltage; an error amplifying unit configured to compare the detected output voltage and a reference voltage and configured to supply an amplified error signal between the detected output voltage and the reference voltage to the pulse width modulating unit; and a single oscillating unit connected to an output of the output voltage detecting unit and an output of the error amplifying unit and operable on a first oscillating mode and a second oscillation mode, wherein the oscillating unit on the first oscillating mode controls a switching frequency of the power switch based on the detected output voltage, and wherein the oscillating unit on the second oscillating mode controls the switching frequency of the power switch based on the amplified error signal.

According to a second aspect of the invention, there is provided a switching DC-DC converter comprising: a switching transistor; an inductor having a first end and a second end, the first end being connected to an output of the switching transistor; a smoothing circuit connected to the second end of the inductor and configured to smooth an output voltage; a output voltage detecting unit configured to detect a voltage corresponding to the output voltage to output a detected voltage; an error amplifying unit configured to compare the detected voltage and a reference voltage to produce an error signal corresponding to a difference between the detected voltage and the reference voltage; a clamping unit configured to clamp an output of the error amplifying unit to a predetermined voltage; a first voltage-current converting unit connected to an output of the error amplifying unit; a low load detecting unit connected to the first voltage-current converting unit; a current sensing unit configured to sense a current flowing through the switching transistor; a second voltage-current converting unit connected to the current detecting unit; a current detecting unit configured to produce a signal corresponding to a value of the current flowing through the switching transistor; a pulse width modulating unit connected to the current detecting unit and configured to turn on or off the switching transistor; and an oscillating unit connected to the pulse width modulating unit, wherein an output from the low load detecting unit and a signal from the output voltage detecting unit are supplied to the oscillating unit, and wherein the switching transistor is switched based on a frequency of the oscillating unit.

According to a third aspect of the invention, there is provided an oscillator for use in a switching DC-DC converter, the oscillator comprising: an oscillating unit configured to generate a pulse signal; an selecting unit configured to select one of an output voltage of the DC-DC converter and an error signal corresponding to an error between the output voltage and a reference voltage; and a frequency control unit configured to compare the signal selected by the input selecting unit and a predetermined voltage to output a frequency setting signal to the oscillating unit, wherein a frequency of the pulse signal is controlled based on the frequency setting signal.

DETAILED DESCRIPTION OF THE EMBODIMENT

A DC-DC converter according to an embodiment of this invention will be described with reference to the drawings.

Figure 1:
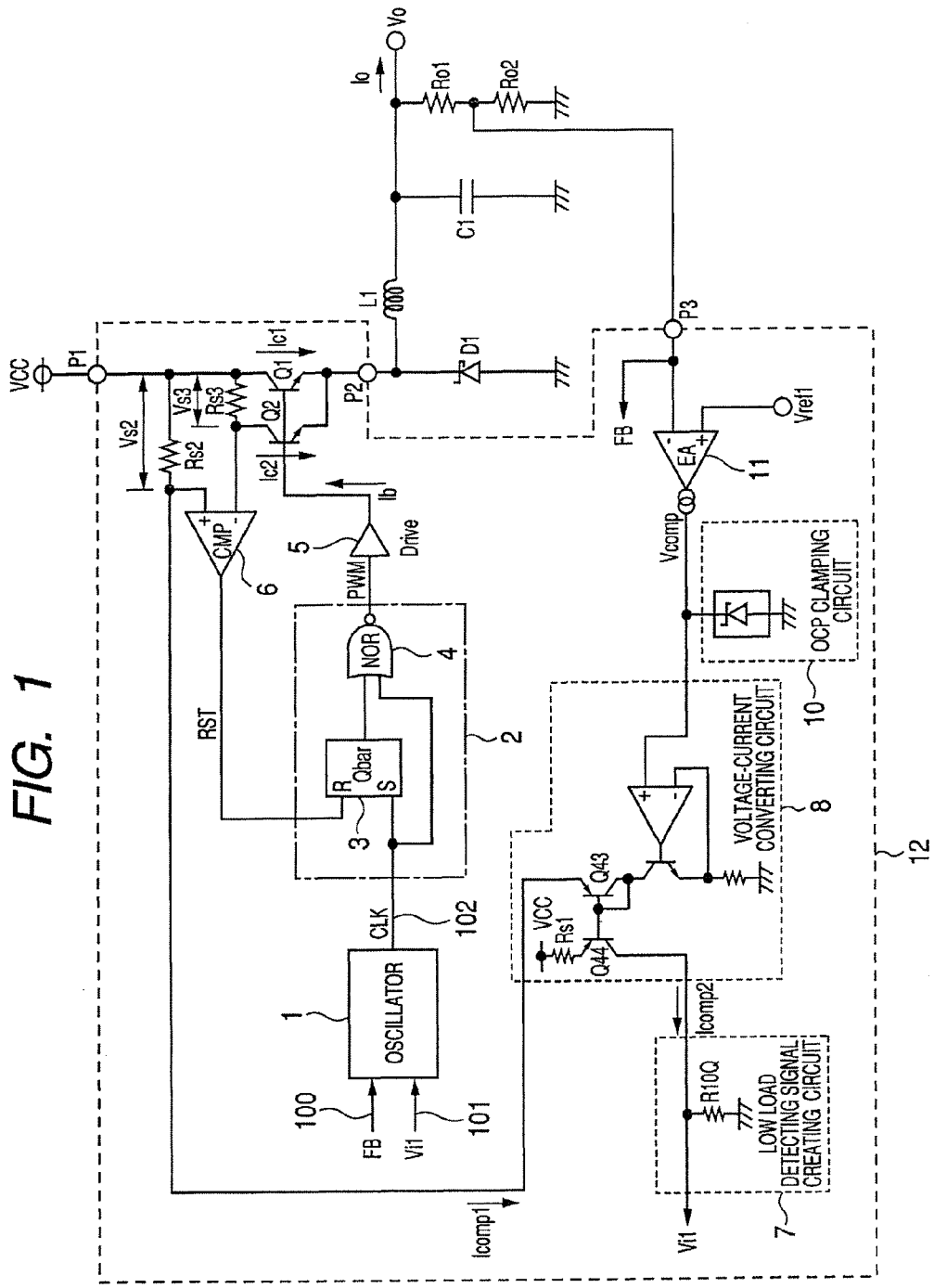
FIG. 1 is a view showing the configuration of a DC-DC converter according to an embodiment of this invention.
Figure 2:
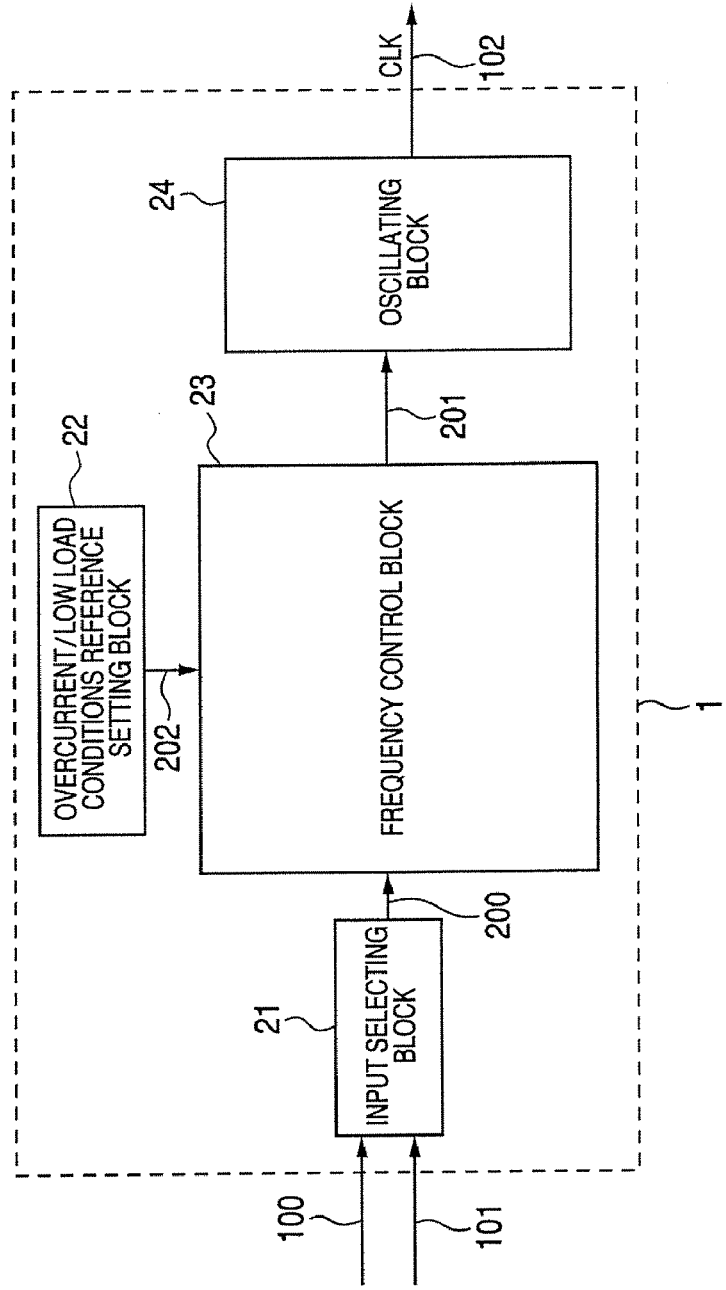
FIG. 2 is a circuit block diagram of the interior of an oscillator.
Figure 3:
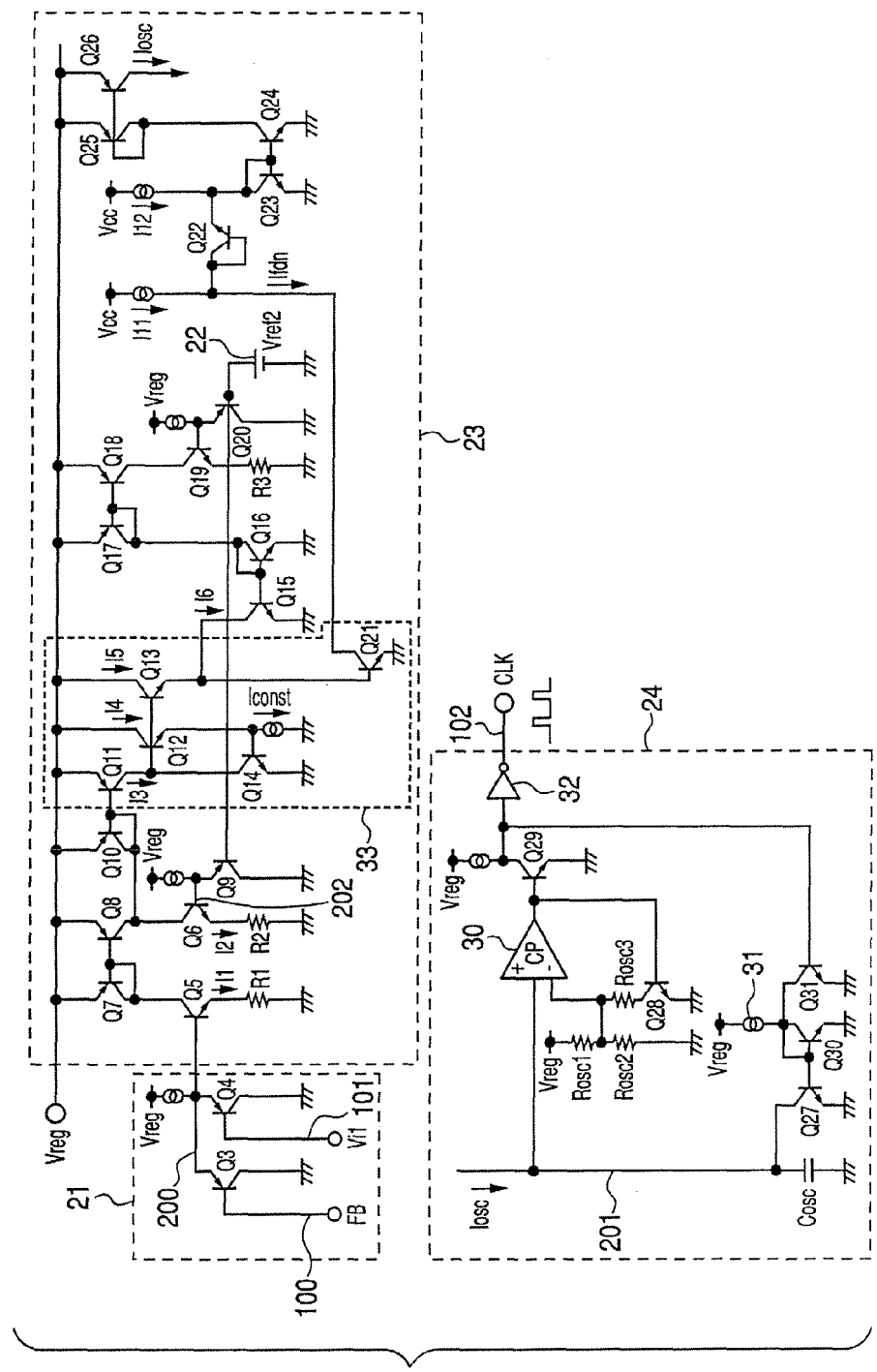
FIG. 3 is a view showing the specific circuit configuration of the interior of an oscillator.
Figures 4A, 4B:
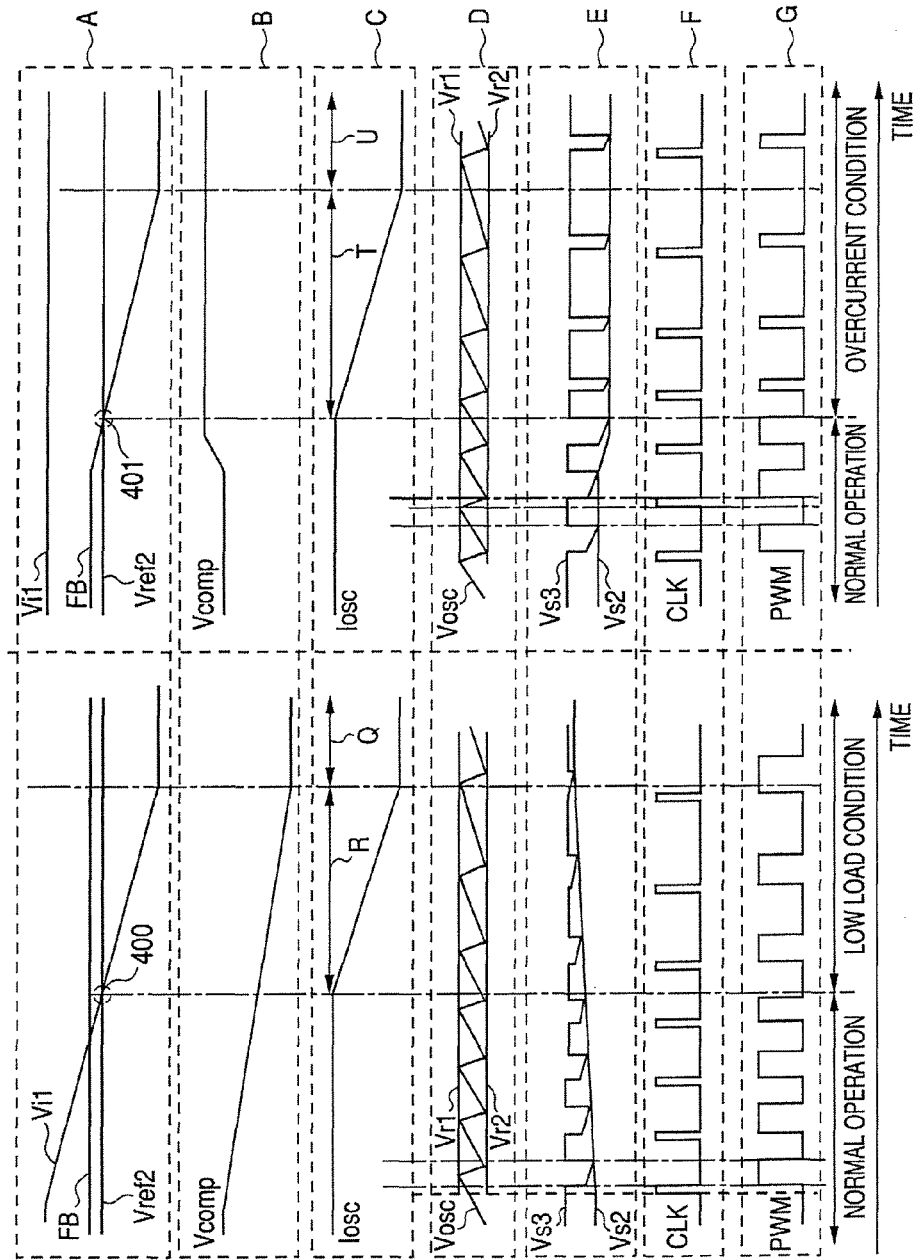
FIGS. 4A and 4B are timing charts for explaining the embodiment of this invention.

FIG. 1 is a view showing the configuration of a DC-DC converter according to the embodiment of this invention. FIG. 2 is a circuit block diagram of the interior of an oscillator. FIG. 3 is a view showing the specific circuit configuration of the interior of an oscillator. FIGS. 4A and 4B are timing charts for explaining the embodiment of invention.

First, referring to FIG. 1, an explanation will be given of the configuration of the DC-DC converter according to this embodiment. In FIG. 1, a power source voltage Vcc (hereinafter referred to as a power source voltage) serving as a DC input voltage is supplied through a first terminal P1 to a control semiconductor integrated circuit 12 for the DC-DC converter. The power source voltage Vcc is turned on or off according to a base control current Ib by a switching transistor Q1 and outputted from a second terminal P2. The switching transistor Q1 is an NPN type bipolar transistor constituting a switching circuit. In this embodiment, as long as particularly not noted, the voltage is represented as a voltage relative to a ground potential. The output from the second terminal P2 is smoothed by an energy storage coil L1, a smoothing capacitor C1 and a Schottky barrier diode D1 thereby supply an output voltage Vo and an output current Io to an external load (not shown). The output voltage Vo is voltage-divided by dividing resistors Ro1 and Ro2. The voltage-divided signal, i.e., an detected signal FB is supplied to the control semiconductor integrated circuit 12 through a third terminal P3. The control semiconductor integrated circuit 12 includes: an error amplifier 11; a voltage-current conversion circuit 8 which converts the error signal Vcomp being an output from the error amplifier 11 into a current; a voltage control circuit including an oscillator 1; and a current detecting switching transistor Q2, in addition to the switching transistor Q1. The control semiconductor integrated circuit 12 further includes a comparator 6; a pulse width modulating circuit 2 including an R-S flip-flop 3 and an NOR circuit 4; and a driving circuit 5. The control semiconductor integrated circuit 12 further includes an OCP clamping circuit 10 for setting an upper limit value of the current for performing overcurrent protection and a low load detecting signal creating circuit 7 for converting an output signal Icomp2 from the voltage-current converting circuit 8. The error signal Vcomp is connected to the OCP clamping circuit 10. The low load detecting signal creating circuit 7 produces an Vi1. The error amplifier 11 is supplied with an output reference voltage Vref1 and the detected signal FB to produce the error signal Vcomp according to a difference between these two inputs. The oscillator 1 produces a pulse signal CLK at a predetermined period. The oscillator 1 is supplied with the detected signal FB and the Vi1 signal from the low load detecting signal creating circuit 7. In the oscillator 1, lower one of the detected signal FB and the Vi1 signal is compared with a period changing reference voltage Vref2 (hereinafter referred to as a prescribed voltage). The prescribed voltage Vref2 is set to a voltage lower than the voltage of the Vi1 signal and detected signal FB during the normal operation. When either one of the detected signal FB and Vi1 signal is lower than the predetermined voltage Vref2, the period of the clock signal CLK is changed from the predetermined period into a longer period. The pulse signal CLK at a predetermined period created by the oscillator 1 is supplied to the setting input S of the R-S flip-flop 3 contained in the pulse width modulating circuit 2. The Qbar output signal from the R-S flip-flop 3 produces a switching control signal PWM through the NOR circuit 4. The switching control signal PWM becomes a base current control signal Ib through a driving circuit 5, which is supplied to the bases of the switching transistor Q1 and the current detecting switching transistor Q2. The output of the comparator 6 (reset signal RST) is connected to the reset input R of the R-S flip-flop 3. The error signal Vcomp is connected to the input of the voltage-current converter circuit 8. Further, by the voltage-current converting circuit 8, the error signal Vcomp is converted from a voltage into a current, thereby creating a signal Icomp1 and a signal Icomp2. The signals Icomp1 and Icomp2 are changed in the same manner. The current detecting switching transistor Q2 is an NPN bipolar transistor and connected to the collector of the switching transistor Q1, i.e. between the second terminal P2 and non-inverting terminal of the comparator 6. The base of the current detecting switching transistor Q2 is common to the base of the switching transistor Q1 and supplied with the base current control signal Ib. The current detecting switching transistor Q2 is turned on or off in synchronism with the switching transistor Q1. The current Ic2 flowing through the current detecting switching transistor Q2 increases with an increase in the current Ic1 flowing through the switching transistor Q1. The voltage signal Vs3 voltage-converted from the current value flowing through the current detecting switching transistor Q2 at a current detecting resistor Rs3 is inputted to the non-inverting input terminal of the comparator 6. The voltage signal Vs2 voltage-converted from the signal Icomp1 at a resistor Rs2 is inputted to the inverting input of the comparator 6. If the voltage signal Vs3 ≧ the voltage signal Vs2 is satisfied in the comparator 6, a reset signal RST resets the R-S flip-flop 3. Then, the switching transistor Q1 and the current detecting switching transistor Q2 are turned off.

Next, an explanation will be given of the operation of the DC-DC converter explained referring to FIG. 1. First, an overcurrent protected state will be described. Generally, the DC-DC converter, during the operation of the overcurrent protection, forcibly narrows the on-time of switching to decrease the on-duty, thereby lowering the output voltage Vo to limit the output current Io. However, since there is a limit for the detecting speed, the on-time cannot be reduced to a certain value or less. Thus, as the output voltage Vo lowers, the output current Io becomes incapable of being limited. For this reason, by lowering the switching frequency, the on-duty is decreased thereby to limit the output current Io. In this way, the switching transistor Q1 is prevented from being broken. The OCP clamping circuit 10 sets the upper limit of the current for the overcurrent protection. The clamped voltage value in the OCP clamping circuit 10 serves as an overcurrent detecting point. While the constant voltage control is done, the error signal Vcomp serving as an output from the error amplifier 11 is lower than the clamped voltage in the OCP clamping circuit 10. Further, the error signal Vcomp is linearly changed with an increase in the load current Io. In this case, the external load becomes high load. When the load current Io increases such that the error signal Vcomp reaches the clamped voltage value, the DC-DC converter enters the overcurrent protecting operation. Namely, the reset signal RST is created such that the switching transistor Q1 and current detecting switching transistor Q2 are turned off. Thus, the on-time is forcibly decreased to lower the output voltage Vo, thereby controlling the output current Io not to be a predetermined value or larger. In this case, since the output voltage Vo lowers, the detected signal FB also lowers. When the detected signal FB ≦ a prescribed voltage Vref2 is satisfied, the oscillator 1 changes the period of the clock signal CLK from a prescribed period from a longer period so that the switching frequency is lowered. In this way, when the output voltage Vo is low, the output current Io is surely limited, thereby preventing the switching transistor Q1 from being broken.

Next, the operation during low load conditions will be explained. Generally, during low load conditions, lowering the switching frequency reduces the switching loss and improves the efficiency. When the conditions of low load are entered, the detected signal FB is increased so that the error signal Vcomp is lowered. Thus, the signal Icomp2 is similarly lowered. As a result, the output Vi1 signal from the low load detecting signal creating circuit 7 is lowered. When the Vi1 signal≦the prescribed voltage Vref2 is satisfied, the oscillator 1 changes the period of the clock signal CLK from a prescribed period to a longer period such that the switching frequency is lowered. When the switching frequency is lowered, the switching loss is reduced thereby to improve the efficiency. As understood from the description, it is not necessary to provide two separate oscillators, one of which lowers the frequency during overcurrent conditions and the other of which lowers the frequency during low load conditions. That is, a single oscillator 1 allows lowering the frequency both during overcurrent conditions and during low load conditions. Accordingly, the circuit size can be also reduced.

Now referring to FIG. 2, an explanation will be given of the configuration of the oscillator 1 in the DC-DC converter according to the embodiment.

FIG. 2 is a block diagram showing the configuration of the oscillator 1 in the DC-DC converter according to this embodiment. As shown in FIG. 2, in the oscillator 1 in the DC-DC converter according to this embodiment, the detected signal FB and signal Vi1 are inputted to an input selecting block 21. The detected signal FB is the same as the detected signal FB inputted through the third terminal P3 shown in FIG. 1. The signal Vi1 is the same as the signal Vi1 outputted from the low load detecting signal creating circuit 7 shown in FIG. 1. The input selecting block 21 outputs a select signal 200 and inputted to a frequency control block 23. Further, the frequency control block 23 receives the prescribed voltage Vref2 from a reference current setting block 22 during overcurrent/low load conditions. A frequency setting signal 201 from the frequency control block 23 is inputted to an oscillating block 24. The oscillating block 24 outputs the clock signal CLK. Next, referring to FIG. 2, the operation of the oscillator 1 in the DC-DC converter will be explained. When the detected signal FB lowers to be relatively lower than the signal Vi1, the input selecting block 21 outputs the signal corresponding to the detected signal FB as the select signal 200. The frequency control block 23 compares the select signal 200 and the prescribed voltage Vref2. When the detected signal FB≦the prescribed voltage Vref2 is satisfied, an operation circuit provided in the frequency control block 23 operates such that a frequency setting signal 201 is supplied to the oscillating block 24 so as to lower the switching frequency. The oscillating block 24 generates the clock signal CLK having a period longer than the prescribed period. On the other hand, when the signal Vi1 lowers to be relatively lower than the detected signal FB, the subsequent operation is the same manner as in a case where the detected signal FB lowers. Namely, when the signal Vi1≦the prescribed voltage Vref2 is satisfied, the operation circuit provided in the frequency block 23 operates such that a frequency setting signal 201 is supplied to the oscillating block 24 so as to lower the switching frequency. Further, as a general operation, since the overcurrent gives high load, the detected signal FB and signal Vi1 will not be lowered simultaneously and will not be interfered with each other. However, even when the detected signal FB and signal Vi1 are lowered simultaneously due to malfunction, the oscillator 1 operates so as to lower the frequency. As a result, breakage of the switching transistor Q1 due to an increase in the output current Io does not occur.

Next, referring to FIG. 3, a specific configuration for lowering the switching frequency of the oscillator 1 in the DC-DC converter according to the embodiment will be explained. FIG. 3 shows an embodiment using bipolar transistors. As shown in FIG. 3, the detected signal FB and the signal Vi1 are supplied to the input selecting block 21 such that the detected signal FB is inputted to the base terminal (hereinafter the base terminal will be referred to as "B") of a transistor Q3 and the signal Vi1 is inputted to B of a transistor Q4. The emitter terminal (hereinafter, the emitter terminal will be referred to as "E") of the transistor Q3 and E of the transistor Q4 are connected to each other. Further, the output of the select signal 200, which is connected to a constant current circuit from an internal regulator output Vreg, is connected to B of a transistor Q5 of the frequency control block 23. The collector terminal (hereinafter the collector terminal will be referred to as "C") of the transistor Q3 and C of the transistor Q4 are connected to a ground potential, respectively. The internal regulator output Vreg is connected to the frequency control block 23. Connected to the internal regulator output Vreg are E of a transistor Q7, E of a transistor Q8, E of a transistor Q10, E of a transistor Q11, C of a transistor Q12, C of a transistor Q13, E of a transistor Q17, E of a transistor Q18, E of a transistor Q25 and E of a transistor Q26. C and B of the transistor Q7 connected to each other are connected to C of the transistor Q5 and B of the transistor Q8. E of the transistor Q5 is connected to the one terminal of a voltage-current converting resistor R1, and another terminal of the voltage-current converting resistor R1 is connected to the ground potential. Connected to C of the transistor Q8 are C of a transistor Q6 and B of the transistor Q10 and B of the transistor Q11. E of the transistor Q6 is connected to the one terminal of a voltage-current converting resistor R2 and another terminal of the voltage-current converting resistor R2 is connected to the ground potential. B of the transistor Q6 and E of the transistor Q9 are connected to each other and further connected to the constant current circuit of the internal regulator output Vreg. C of the transistor Q9 is connected to the ground potential. B of the transistor Q9 and B of a transistor Q20 are connected to each other and further connected to the prescribed voltage Vref2. C of the transistor Q20 is connected to the ground potential. Connected to C of the transistor Q11 are B of the transistor Q12, B of the transistor Q13 and C of a transistor Q14. E of the transistor Q14 is connected to the ground potential. B of the transistor Q14 is connected to E of the transistor Q12 and further connected to the ground potential through the constant current circuit 100. Connected to E of the transistor Q13 are C of a transistor Q15 and B of a transistor Q21. Connected to B of the transistor Q15 are B and C of a transistor Q16, C and B of a transistor Q17 and B of a transistor Q18. E of the transistor Q15 and E of the transistor Q16 are connected to the ground potential. C of the transistor Q18 is connected to C of a transistor Q19. The one terminal of a voltage-current converting resistor R3 is connected to E of the transistor Q19 and another terminal of the voltage-current converting resistor R3 is connected to the ground potential. B of the transistor Q19 and E of the transistor Q20 are connected to each other and further connected to a constant current circuit from the internal regulator output Vreg.

C of the transistor Q21 and C and B of a transistor Q22 are connected to each other and further connected to the constant current circuit from the internal regulator output Vreg. E of the transistor Q21 is connected to the ground potential. Connected to E of the transistor Q22 are C and B of a transistor Q23, B of a transistor Q24 and the constant current circuit from the internal regulator output Vreg. E of the transistor Q23 and E of the transistor Q24 are connected to the ground potential. Connected to C of the transistor Q24 are C and B of a transistor Q25 and B of a transistor Q26. C of the transistor Q26 which produces the frequency setting signal 201 is connected to the oscillating block 24. The frequency setting signal 201 is connected to the one terminal of a frequency setting capacitor Cosc and further connected to C of a transistor Q27 and the non-inverting input terminal of a comparator 30. Another terminal of the frequency setting capacitor Cosc is connected to the ground potential. Connected to the inverting input terminal of the comparator 30 are the one terminal of a resistor Rosc3, the one terminal of a resistor Rosc1 connected to the internal regulator output Vreg and the one terminal of a resistor Rosc2 connected to the ground potential. C of a transistor Q28 is connected to another terminal of the resistor Rosc3. The output of the comparator 30 is connected to B of the transistor Q28 and B of a transistor Q29. Connected to C of the transistor Q29 are B of a transistor Q31, an input to the an inverter 32 and a constant current circuit from the internal regulator output Vreg. The output form the inverter 32 serves as the clock signal CLK. C of the transistor Q31 is connected to C and B of a transistor Q30 and B of the transistor Q27 and further connected to a constant current circuit 31 from the internal regulator output Vreg. E of the transistor Q27, E of the transistor Q28, E of the transistor Q29, E of the transistor Q30 and E of the transistor Q31 are connected to the ground potential.

Next, referring to FIGS. 1, 2, 3 and 4A and 4B, an explanation will be given of the operation of lowering the switching frequency in this embodiment. FIG. 4A illustrates the operation during low load conditions. FIG. 4B illustrates the operation during overcurrent conditions. "A" in FIGS. 4A and 4B is a graph showing changes in the waveforms of the signal Vi1, detected signal FB and prescribed voltage Vref2 during low load conditions, normal operation conditions and overcurrent conditions. "B" in FIGS. 4A and 4B is a graph showing changes in the waveform of the error signal Vcomp during low load conditions, normal operation conditions and overcurrent conditions. "C" in FIGS. 4A and 4B is a graph showing changes in the waveform of a charging current Iosc of the frequency setting signal 201 during low load conditions, normal operation conditions and overcurrent conditions. "D" in FIGS. 4A and 4B is a graph showing changes in the waveform of a charging voltage (Vosc) of the frequency setting signal 201 during low load conditions, normal operation conditions and overcurrent conditions. "E" in FIGS. 4A and 4B is a graph showing changes in the waveforms of the voltage signal Vs2 being an input to the non-inverting input terminal of the comparator 6 and the voltage signal Vs3 being an input to the inverting input terminal of the comparator 6 during low load conditions, normal operation conditions and overcurrent conditions. "F" in FIGS. 4A and 4B is a graph showing changes in the waveform of the clock signal CLK during low load conditions, normal operation conditions and overcurrent conditions. "G" in FIGS. 4A and 4B is a graph showing changes in the waveform of the switching control signal PWM in FIG. 1 during low load conditions, normal operation conditions and overcurrent conditions.

First, the operation during low load conditions will be explained.

When the operation condition is shifted from the normal operation conditions to the low load conditions, the error signal Vcomp gradually lowers ("B" in FIG. 4A).

Correspondingly, the signal Vi1 starts to lower and eventually becomes lower than the detected signal FB and prescribed voltage Vref2 (dotted line 400 in FIG. 4A "A"). Then, the transistor Q4 operates so that the voltage added to the signal Vi1 by the base-emitter voltage VBE (hereinafter referred to as VBE) of the transistor Q4 is applied to the select signal 200. The signal Vi1 is therefore selected. Thus, the voltage subtracted from the selected signal 200 by VBE of the transistor Q5 is applied to the voltage-current converting resistor R1. Because VBE of the transistor Q4 and VBE of the transistor Q5 are approximately equal, the voltage equal to the signal Vi1 is applied to the voltage-current converting resistor R1. Accordingly, because the base current of the transistor Q5 is substantially negligible, the current I1 flowing through C of the transistor Q5 can be expressed by $$I1 = Vi1/R1 \tag{1}$$

The current I1 flows through C of the transistor Q7. Since the transistor Q7 and the transistor Q8 constitute a current mirror, the same current as the current I1 flows through C of the transistor Q8. On the other hand, since the prescribed voltage Vref2 is applied to B of the transistor Q9, the voltage added to the prescribed voltage Vref2 by VBE of the transistor Q9 (signal 202) is applied to B of the transistor Q6. Thus, the voltage subtracted from the signal 202 by VBE of the transistor Q6 is applied to the voltage-current converting resistor R2. Since VBE of the transistor Q6 are VBE of the transistor Q9 are approximately equal, the voltage having a value equal to the prescribed voltage Vref2 is applied to the voltage-current converting resistor R2. Thus, because the base current of the transistor Q6 is substantially negligible, the current I2 flowing through C of the transistor Q6 can be expressed by $$I2 = Vref2/R2 \tag{2}$$

Accordingly, the current subtracted from I2 by I1 flows through C of the transistor Q10. Further, since the transistor Q10 and the transistor Q11 constitute the current mirror, the current I3 flowing through C of the transistor Q11 can be expressed by $$I3 = I2 - I1 \tag{3}$$

It should be noted that R1 and R2 must have equal resistances. By substituting Equations (1) and (2) into Equation (3), I3=(Vref2−Vi1)/R1. This is identical to direct voltage comparison between the prescribed voltage Vref2 and the signal Vi1. Further, I4 is equal to Iconst. Namely, $$I4 = Iconst \tag{4}$$

Further, the prescribed voltage Vref2 is applied to B of the transistor Q20. Thus, the voltage added to the prescribed voltage Vref2 by VBE of the transistor Q20 is applied to B of the transistor Q19. Accordingly, the voltage lowered from voltage at B of the transistor Q19 by VBE of the transistor Q20 is applied to the voltage-current converting resistor R3. Since VBE of the transistor Q19 and VBE of the transistor Q20 are nearly equal to each other, the voltage equal to the prescribed voltage Vref2 is applied to the voltage-current converting resistor R3. Further, since the transistor Q17 and the transistor Q18 constitutes the current mirror, the current flowing through C of the transistor Q17 and the current flowing through C of the transistor Q18 are equal to each other. Further, since the transistor Q15 and the transistor Q16 constitute the current mirror, the current flowing through C of the transistor Q16 and the current I6 flowing through C of the transistor Q15 are equal to each other. Therefore, the current flowing through C of the transistor Q18 is equal to I6. Further, as apparent from FIG. 3, the current flowing through C of the transistor Q18 is equal to the current flowing through C of the transistor Q19. Therefore, the current flowing through C of the transistor Q19 is equal to I6. Accordingly, $$I6 = Vref2/R3 \quad (5)$$

Since the current flowing through B of the transistor Q21 is negligible, $$I5 = I6 \quad (6)$$

The block 33 in FIG. 3 constitutes a current multiplication/division operating circuit. Therefore, the current Ifdn flowing through C of the transistor Q21 is expressed by the following equation:

$$Ifdn = I3*I4/I5 \quad (7)$$

Next, an equation for computing the charging current Iosc will be described. First, the current subtracted from the I11 by Ifdn flows through C of the transistor Q22. Further, the current added to I12 by the current flowing through C of the transistor Q22 flows through C of the transistor Q23. Since the transistor Q23 and the transistor Q24 constitute the current mirror, the current flowing through C of the transistor Q23 and the current Iosc flowing through C of the transistor Q24 are equal to each other. Further, since a transistor Q25 and a transistor Q26 constitute the current mirror, the current flowing through C of the transistor Q25 is equal to the current Iosc flowing through C of the transistor Q26. As apparent from FIG. 3, the current flowing through C of the transistor Q24 and the current flowing through C of the transistor Q25 are equal to each other. Therefore, $$Iosc = I12 + (I11 - Ifdn) \quad (8)$$

Thus, if Ifdn increases, (I11−Ifdn) decreases. Therefore, Iosc decreases. Further, even if Ifdn becomes larger than I11, the transistor Q22, which is a diode configuration, will not be extracted from I12. So, the minimum value of Iosc is I12. Namely, Iosc becomes constant like period Q in FIG. 4A "C" so that the lower limit of the oscillating frequency can be set.

By substituting Equation (7) into Equation (8), $$Iosc = I12 + (I11 - I3*I4/I5) \quad (9)$$

Further, by substituting Equation (3) into Equation (9)

$$Iosc = I12 + \{I11 - (I2 - I1)*I4/I5\} \quad (10)$$

Now, during the normal operation conditions, since the signal Vi1>the prescribed voltage Vref2, I1 becomes larger than I2 (R1=R2 is set). If I1≧I2, in the circuit operation, the voltage at C of the transistor Q8 becomes approximately equal to the internal regulator output Vreg, I3≅0. Then, Iosc=I12+I11. When shifted to the low load conditions, I1 becomes I1<I2, and I3 starts to flow. Thus, since {I11−(I2−I1)*I4/I5} in Equation (10) becomes smaller than I11, the charging current Iosc of the frequency setting signal 201 starts to fall (period R in FIG. 4A "C").

Accordingly, the rising time of the charging voltage Vosc of the frequency setting capacitor Cosc in the oscillating block 24 in FIG. 3 is lengthened. When the charging voltage Vosc reaches an upper threshold value (Vr1), the clock signal CLK becomes a High voltage (hereinafter referred to as H voltage) (FIG. 4A "F"). At this time, since a Low voltage is applied to B of the transistor Q31, the transistor Q31 is turned off, and the current mirror circuit including the transistor Q30 and the transistor Q27 operates. Thus, the current equal the having a current value in the constant current circuit 31 is passed from the frequency setting signal 201 to the ground terminal through C of the transistor Q27. At this time, since the charging voltage Vosc must be lowered, the current value in the constant current circuit 31 must be made larger than that of the charging current Iosc. This is because the falling time (hereinafter referred to as a fall time) of the charging voltage Vosc becomes the length of the H voltage of the clock signal CLK. Further, since the clock signal CLK is supplied to the R-S flip-flop of the pulse signal modulating circuit 2 at the subsequent stage, the length of the H voltage of the clock signal CLK is not required to be lengthened. For this reason, the current value in the constant current circuit 31 is set for about ten times as large as the current value of the charging current Iosc. When the charging voltage Vosc reaches a lower threshold value (Vr2), the clock signal CLK becomes a Low voltage (hereinafter referred to as L voltage) (FIG. 4A "F"). Thus, the output from the comparator 30 becomes the Low level so that the transistor Q28 is turned off. Further, the transistor Q31 is turned on so that the current mirror including the transistor Q27 and the transistor Q30 becomes non-operational. Thus, the frequency setting capacitor Cosc starts to be charged with the charging current Iosc. Therefore, if the charging current Iosc is decreased, the rise time of the charging voltage Vosc is lengthened so that the shifting time of the subsequent clock signal CLK from the L voltage to the H voltage (time holding the L voltage) is lengthened, thereby lowering the frequency.

Next, the operation during overcurrent current conditions will be explained. When the operation condition is shifted from the normal operation conditions to the overcurrent conditions, the output voltage Vo lowers so that the detected signal FB gradually lowers ("A" in FIG. 4B) and becomes lower than the prescribed voltage Vref2 (dotted line 401 in FIG. 4B "A"). The transistor Q4 operates so that the voltage added to the detected signal FB by VBE of the transistor Q4 is applied to the select signal 200. Accordingly, the detected signal FB is selected. Thus, the voltage lowered from the select signal 200 by VBE of the transistor Q5 is applied to the voltage-current converting resistor R1. Since VBE of the transistor Q3 and VBE of the transistor Q5 are approximately equal to each other, the voltage with a value equal to the detected signal FB is applied to the voltage-current converting resistor R1. Thus, since the base current of the transistor Q5 is substantially negligible, the current I1 flowing through C of the transistor Q5 is expressed by $$I1 = FB/R1 \quad (11)$$

The subsequent operation is the same as that during the low load conditions. Therefore, from Equation (10), when shifted to the low load conditions so that the detected signal FB lowers, I1 becomes I1<I2, and I3 starts to flow. Therefore, {I11−(I2−I1)*I4/I5} in Equation (10) becomes smaller than I11, the charging current Iosc of the frequency setting signal 201 starts to fall (period T in FIG. 4B "C").

Even if Ifdn becomes larger than I11, the transistor Q22, which is a diode configuration, will not be extracted from I12. Therefore, the minimum value of Iosc is I12. Namely, Iosc becomes constant like period U in FIG. 4B "C" so that the lower limit of the oscillating frequency can be set. Accordingly, by providing the input selecting block 21 shown in FIG. 2, the single frequency control block 23 permits two different frequency control operations during the low load condition and during the overcurrent conditions. It is needless to say that it is not necessary to provide the frequency control block for the low load conditions and the frequency control block for the overcurrent conditions separately, thereby simplifying the circuit configuration. Further, if the circuit configuration is realized in a semiconductor integrated circuit, the circuit scale can be reduced and the chip size can be reduced, which contributes to cost reduction of the DC-DC converter and power saving during the low conditions.

By substituting Equations (1), (2), (4), (5) and (6) into Equation (10), Iosc is expressed by $$Iosc = I12 + \{I11 - (Vref2/R1 - Vi1/R2)*Iconst/(Vref2/R3)\} \quad (12)$$

Further, as described above, since R1=R2, Equation (12) can be arranged as follows:

$$Iosc = I12 + \{I11 - (Vref2 - Vi1)*Iconst/Vref2\}*R3/R1 \quad (13)$$

As understood from Equation (13), I11, I12 an Iconst are a constant, respectively, and R1 and R3 are in a relationship of ratio as a denominator and a numerator, respectively. For this reason, by using the current converting resistors R1, R2 and R3 of the same kind of resistor, their temperature characteristics and variations can be cancelled. Thus, the charging current Iosc has no temperature characteristic and variation. Accordingly, the frequency control operation with no temperature characteristic and variation can be realized.

As understood from the above description, the switching DC-DC converter according to this embodiment, two different frequency control operations during the low load conditions and overcurrent conditions can be realized by the single oscillator, which contributes to cost reduction of the DC-DC converter and power saving during the low conditions. Further, the frequency control operation with no temperature characteristic and variation can be realized.

What is claimed is:

1. A switching DC-DC converter comprising:
   at least one power switch;
   a pulse width modulating unit configured to control on/off timing of the power switch;
   an inductor having one end connected to the power switch;
   a smoothing unit connected to the other end of the inductor and configured to produce a smoothed DC output voltage;
   an output voltage detecting unit configured to detect the DC output voltage;
   an error amplifying unit configured to compare the detected output voltage and a reference voltage and configured to supply an amplified error signal between the detected output voltage and the reference voltage to the pulse width modulating unit; and
   a single oscillating unit connected to an output of the output voltage detecting unit and an output of the error amplifying unit and operable on a first oscillating mode and a second oscillation mode,
   wherein the oscillating unit on the first oscillating mode controls a switching frequency of the power switch based on the detected output voltage, and
   wherein the oscillating unit on the second oscillating mode controls the switching frequency of the power switch based on the amplified error signal.

2. The switching DC-DC converter according to claim 1, wherein the oscillating unit lowers the frequency as a load lowers according to the amplified error signal.

3. The switching DC-DC converter according to claim 1, wherein the oscillating unit lowers the frequency as the output voltage lowers.

4. The switching DC-DC converter according to claim 1, wherein the oscillating unit selects one of the amplified error signal and the output voltage to control the frequency.

5. The switching DC-DC converter according to claim 1, wherein the oscillating unit comprises:
   an input selecting unit configured to select one of the amplified error signal and the output voltage;
   a frequency control unit connected to the input selecting unit;
   an overcurrent/low load reference current setting unit connected to the frequency control unit; and
   an oscillating unit connected to the frequency control unit and configured to produce a clock that determines the switching frequency.

6. The switching DC-DC converter according to claim 5, wherein the frequency control unit comprises an operation circuit that is temperature-compensated.

7. The switching DC-DC converter according to claim 1, wherein the output from the error amplifying unit is clamped to limit a current flowing through the power switch.

8. The switching DC-DC converter according to claim 1, further comprising a current limiting circuit configured to detect the current flowing through the power switch and supply a trigger signal of turning off the power switch to the pulse width modulating unit when the detected current exceeds a threshold value.

9. A switching DC-DC converter comprising:
   a switching transistor;
   an inductor having a first end and a second end, the first end being connected to an output of the switching transistor;
   a smoothing circuit connected to the second end of the inductor and configured to smooth an output voltage;
   a output voltage detecting unit configured to detect a voltage corresponding to the output voltage to output a detected voltage;
   an error amplifying unit configured to compare the detected voltage and a reference voltage to produce an error signal corresponding to a difference between the detected voltage and the reference voltage;
   a clamping unit configured to clamp an output of the error amplifying unit to a predetermined voltage;
   a first voltage-current converting unit connected to an output of the error amplifying unit;
   a low load detecting unit connected to the first voltage-current converting unit;
   a current sensing unit configured to sense a current flowing through the switching transistor;
   a second voltage-current converting unit connected to the current detecting unit;
   a current detecting unit configured to produce a signal corresponding to a value of the current flowing through the switching transistor;
   a pulse width modulating unit connected to the current detecting unit and configured to turn on or off the switching transistor; and
   an oscillating unit connected to the pulse width modulating unit,
   wherein an output from the low load detecting unit and a signal from the output voltage detecting unit are supplied to the oscillating unit, and
   wherein the switching transistor is switched based on a frequency of the oscillating unit.

* * * * *